(12) United States Patent
Frey

(10) Patent No.: US 7,455,276 B2
(45) Date of Patent: Nov. 25, 2008

(54) SEAT SECURING SYSTEM

(75) Inventor: Andreas Frey, Immenstaad (DE)

(73) Assignee: Recaro Aircraft Seating GmbH Co. KG, Schwabisch Hall (DE)

( * ) Notice: Subject to any disclaimer, the term of this patent is extended or adjusted under 35 U.S.C. 154(b) by 109 days.

(21) Appl. No.: 10/570,763

(22) PCT Filed: Aug. 10, 2004

(86) PCT No.: PCT/EP2004/008918

§ 371 (c)(1),
(2), (4) Date: Oct. 3, 2006

(87) PCT Pub. No.: WO2005/028306

PCT Pub. Date: Mar. 31, 2005

(65) Prior Publication Data

US 2007/0164187 A1    Jul. 19, 2007

(30) Foreign Application Priority Data

Sep. 10, 2003   (DE) .............................. 103 41 624

(51) Int. Cl.
*A47B 97/00* (2006.01)
(52) U.S. Cl. .................... 248/500; 410/105; 244/118.6; 244/122 R; 248/503.1

(58) Field of Classification Search ................. 248/500, 248/503, 503.1, 544, 429; 244/122 R, 118.5, 244/118.6; 296/65.03; 410/105, 104, 80
See application file for complete search history.

(56) References Cited

U.S. PATENT DOCUMENTS

| 3,241,501 | A | | 3/1966 | Watts |
| 4,396,175 | A | | 8/1983 | Long et al. |
| 4,796,837 | A | * | 1/1989 | Dowd ..................... 244/122 R |
| 5,489,172 | A | * | 2/1996 | Michler ..................... 410/105 |
| 5,871,318 | A | | 2/1999 | Dixon et al. |
| 6,299,230 | B1 | | 10/2001 | Oettl |
| 6,827,531 | B2 | * | 12/2004 | Womack et al. ............. 410/104 |
| 6,902,365 | B1 | * | 6/2005 | Dowty ......................... 410/105 |
| 2005/0180836 | A1 | * | 8/2005 | Dowty ......................... 410/105 |
| 2006/0104740 | A1 | * | 5/2006 | Girardin et al. ............. 410/105 |

FOREIGN PATENT DOCUMENTS

DE          299 02 465          6/1999

* cited by examiner

*Primary Examiner*—Ramon O Ramirez
(74) *Attorney, Agent, or Firm*—Posz Law Group, PLC

(57) ABSTRACT

The invention relates to a seat securing system for securing air passenger seats to a securing rail (10), whereby the system permits a relative motion between a mounting part (24) and a base body (26) that, in the longitudinal direction of said securing rail (10), can be brought into a fixed position. In this securing position, a locking body (34), which can pivot from a release position and into a locking position and which is subjected to the action of an energy storage device (32), secures the respective detent parts (22, 30) and thus the base body (24) and mounting part (26) on the securing rail (10). Said energy storage device permits a compensation of tolerances so that the inventive fitting always rests securely against the rail(10).

6 Claims, 3 Drawing Sheets

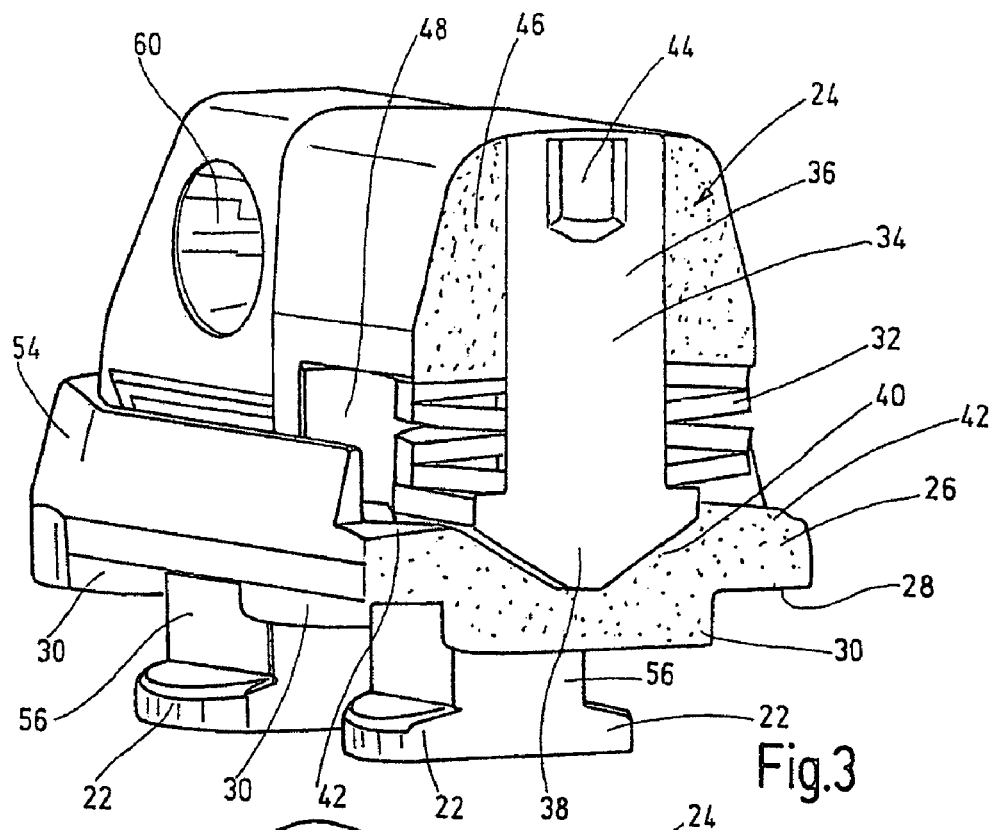
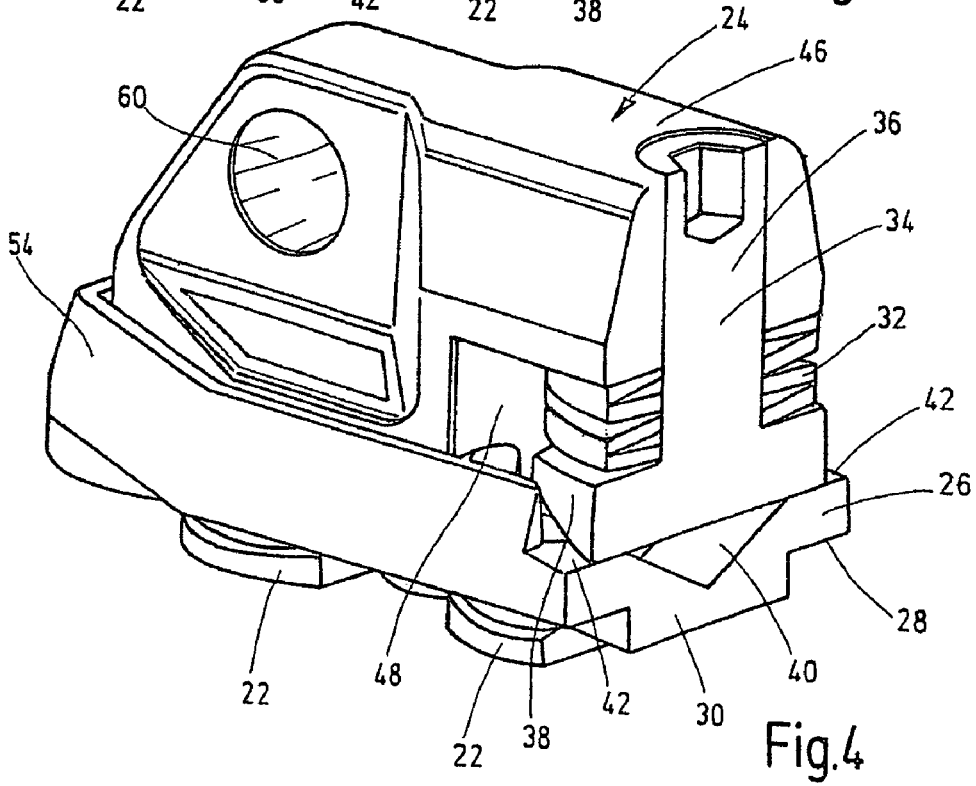

SEAT SECURING SYSTEM

The invention relates to a seat securing system, especially for securing aircraft passenger seats to the floor of an aircraft, having at least one securing rail designed as a hollow section which on its upper side facing the aircraft passenger seat is provided with a longitudinal channel which is bordered by the free section flanks of the hollow section and which in the longitudinal direction of the securing rail in a defiable grid has through openings which widen its free entry cross section and which are used for engagement of detent parts of a base body which are configured in succession in a row and are spaced apart from each other, the spacing of the detent parts of the base body being adapted to the spacing of the through openings, and when the detent parts move in relative terms opposite the through openings along the longitudinal axis of the securing rail the detent parts can be moved into contact with the section flanks of the hollow section, and next to the base body as an additional component there being a mounting part for mounting on the securing rail, which part has other detent parts for engagement with the assignable through openings.

Such seat securing systems are used to configure aircraft passenger seats in a definable alignment pattern with definable distances viewed in the longitudinal direction of the aircraft and in this way to provide seating for the aircraft cabin. Several securing rails in the floor of the cabin extend in several rows next to each other in the longitudinal direction of the aircraft fuselage. Generally one passenger seat or a row of passenger seats configured next to each other as a seat unit with its base feet is securely coupled to the securing rails according to a definable seating pattern, in the longitudinal direction of the base feet two pairs of foot parts being detachably fixed on two securing rails located in parallel next to each other by means of so-called base bodies.

In the known designs for seat securing systems as can be readily obtained on the market, the base body has a mounting part for mounting on the securing rail and on its upper side opposite the securing rail a fixing eye for fixing the fastening bolt of the respective base foot for the passenger seat. On its side facing the securing rail the base body has detent parts opposite in pairs in the longitudinal direction with a disk-circular cross section, which can be precisely engaged spaced apart from each other with the through openings of the securing rail in the longitudinal direction of the base body. In this way the base body with its detent parts can be partially inserted into the through openings and by displacing the base body in the longitudinal direction opposite the fixed securing rail by the grid spacing on the through openings the detent parts come into contact underneath with the free section flanks of the hollow section-like securing rail. On the opposite side the prior-art solution has a crosspiece-like widening on the base body, this widening being supported on the upper side of the section flanks of the securing rail and extending over a through opening located between the two pairs of detent parts of the base body.

In the known designs the respective base body then has a mounting part the technical term of which is "plunger," which can be moved up and down by a fixing means of the base body transversely to the its longitudinal mobility, in the lowered position other detent parts of the mounting part precisely engaging the assignable through openings of the section rail and in this way in the longitudinal direction securing the mounting part in its position on the securing rail which is additionally secured against lifting off vertically by the detent parts which extend under the free section flanks of the securing rail. By tightening a fastener of the fixing means on the one hand the other detent parts of the mounting part (plunger) are then definitively fixed in their position on the securing rail and otherwise the other detent parts of the base body are braced against the section flanks of the hollow chamber-like mounting rail, so that the base body is securely held on the securing rail both in the axial and also in the radial direction.

In this way, reliable diversion of crash forces which can act on the aircraft passenger seat into the floor structure of the aircraft cabin with its securing rails is achieved. The disadvantage in the prior-art solution is the increased assembly effort arising in practical application and that the existing systems are not suited for frequent installation or modification.

U.S. Pat. No. 3,241,501 discloses a seat securing system in which the detent parts of the base body can be moved without further relative motion along the longitudinal direction of the securing rail to engage the assignable recesses within two adjacent section flanks of the hollow section as the securing rail. A plate-shaped mounting part is rigidly connected to this base body and is provided on its bottom with other detent parts which in a definable grid in the securing rail extend through through openings which widen in the free entry cross section. Another detent part mounted in the middle, as a component of an actuating pin, is guided so as to be able to move axially in the longitudinal direction between the other two detent parts of the base body by way of a gripping loop and can be pulled against the spring force of a compression spring out of a base position in which the other middle detent part engages the through opening which can be assigned to it, into an actuating position in which a pinion of the actuating pin engages the pinions of the adjacent detent parts of the base body.

If at this point the gripping loop is manually pivoted by 90°, the indicated pinion drive is actuated and the detent parts of the base body are pivoted by way of this pinion drive into the locking position transversely to the longitudinal direction of the securing rail, in which tapering foot parts of the detent parts extend under the respective section flanks of the hollow section as the securing rail. In this locking position the other detent parts of the mounting part at least mounted on the outside then engage the through openings of widened cross section. A detachment process of the seat securing system from the assignable securing rail is accordingly possible in the reverse sequence, as described. Although this prior-art solution has the advantage that without further longitudinal displacement in the longitudinal direction of the securing rail the securing system can be fixed directly on the rail, pivoting of the detent parts of the base body by 90° out of the initial position is necessary for the actual locking process, so that obstacles in operation may arise or even damage may occur to the relatively sensitive section flanks of the hollow section, especially if it is to be built of lightweight metallic materials for reasons of weight.

On the basis of this prior art, the object of the invention is to further improve the known seat securing systems such that they can be implemented cost-effectively and installed easily and reliably while simultaneously increasing seating comfort for a seat which has been fixed in this way to a cabin floor.

In the relative motion between the mounting part and the base body they can be moved transversely to the longitudinal direction of the securing rail in a fixing position and in that in the fixing position a locking body which is under the action of an energy storage device and which can be pivoted out of a release position into a locking position fixes the respective detent parts and accordingly the base body and mounting part on a securing rail, the existing systems are further improved in that the installation effort on site can be reduced, and the advantages of the system as claimed in the invention become apparent especially in case of frequent installation and modification measures. A simple pivoting process of the locking body can effect reliable mechanical locking between the fitting formed from the base body and the mounting part on the securing rail, under the influence of the energy storage device not only a nonpositive, but also a frictional connection thus being obtained between the fitting and the securing rail. The indicated energy storage device allows compensation of tolerances so that the fitting always securely adjoins the rail. Thus, the seat securing system as claimed in the invention affords the implementation of the so-called and-rattle function. Another advantage of the seat securing system as claimed in the invention is that with low actuating forces and little material accurately defined and user-friendly fixing and detachment possibilities arise for the operators.

Other advantageous embodiments of the seat securing system as claimed in the invention are the subject matter of the other dependent claims.

The seat system as claimed in the invention will be detailed below using one embodiment as shown in the drawings.

The figures are schematic and not to scale.

FIGS. 3 and 4 show in a partial section a perspective viewed from the back as shown in FIG. 1, once in the release position, once in the locking position.

Figure 1:
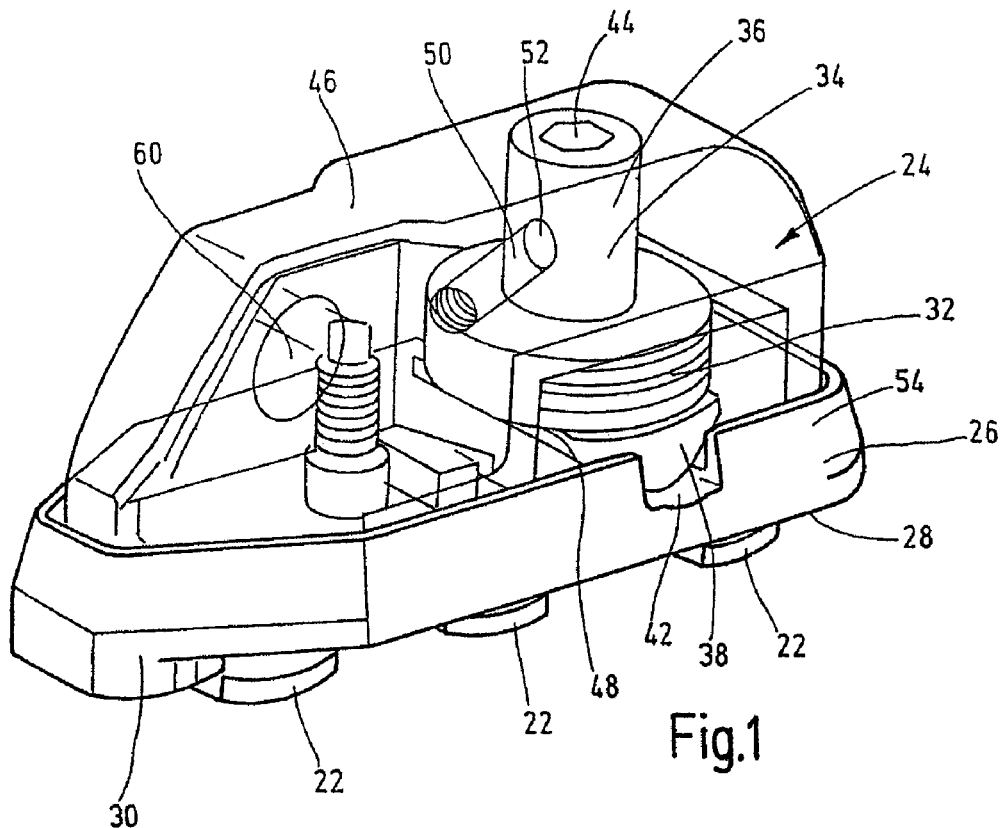
FIG. 1 shows a perspective top view of part of the seat securing system in the locking position.

The seat securing system as claimed in the invention as shown in the figures is used especially for securing aircraft passenger seats (not shown) to the floor (cabin floor) of an aircraft.

This seat securing system can however also be used in other areas, for example in the area of vehicles, such as tour busses, and ferries, or the like; but it can also be used within the scope of hall seating, for example for conference halls, theaters, or the like.

The seat securing system has a securing rail 10 (cf. FIG. 5) which is designed as a hollow section. Several such securing rails 10 extend preferably in the longitudinal direction of the cabin floor of an aircraft, the respective securing rail 10 with its upper side being integrated preferably flush in the cabin floor of an aircraft. The upper side 12 of each securing rail 10 thus undergoes transition flush into the upper side of the cabin floor. Two or more mounting rails 10 extending in parallel to each other are then used for installation of air passenger seats within an aircraft cabin, and a single air passenger seat or several air passenger seats configured in a row next to each other can be joined as a single entity to the securing rails 10.

If the respective aircraft cabin is to be used to transport cargo, it is also possible to remove the seating again and by way of the seat securing system which is still to be detailed to mount not only passenger seats on the securing rails 10, but also to lash down cargo and the like in the cabin by way of the securing rails 10. Furthermore, the seat securing system as claimed in the invention can also be used to attach a passenger seat with only one base foot, or, if the upright construction of the seat has several seat legs, to fix them in the forward area and in the rear area of the seat in this way.

The hollow section of a securing rail 10 referred to in the foregoing on its upper side 12 borders a longitudinal channel 14 which is bordered by the two free section flanks 16 of the hollow section which face each other. This longitudinal channel 14 in a definable grid has through openings 18 which widen its free entry cross section, the through openings 18 preferably having a uniform distance from each other. The through openings 18 are preferably designed as holes and with the adjacently opposite arc-shaped circle segments 20 end in the free ends of the section flanks 16.

The through openings 18 are used for engagement of detent parts 22 of a base body designated as a whole as 24, which parts are spaced apart from each other and are configured in succession in a row. The spacing of the detent parts 22 of the base body 24 corresponds to the spacing of the through openings 18 within the securing rail 10. In addition to the base body, as another component there is a mounting part 26 for mounting on the securing rail 10. The mounting part 26 on its bottom 28 facing the upper side 12 of the securing rail 10 has other detent parts 30 in the same grid dimension as the detent parts 22 of the base body 24. Depending on the outfitting with through openings and their distance from each other, the individual detent parts 22 and 30 however can also have different distances to each other.

As furthermore is to be seen from the figures, at least the base body 24 is displaceable opposite the mounting part 26 transversely to the longitudinal direction of the securing rail 10 into a fixing position (cf. FIGS. 1 and 4), in the fixing position a locking body 34 which is under the action of an energy storage device 32 and which can be pivoted out of a release position (cf. FIGS. 3 and 5) into a locking position (cf. FIG. 1 and 4) fixing the respective detent parts 22, 30, and accordingly the base body 24 and mounting part 26 on a securing rail 10.

The locking body 34 has a key 38 which can be pivoted in the base body 24 by means of an adjustment stud 36 and which in the release position engages a key groove 40 (FIGS. 3 and 5) of the mounting part 26 and in the locking position transversely thereto extends over the upper side walls 42 which border the key groove 40 on the edge side. On its upper side free end a hexagonal socket recess 44 is used to actuate the adjustment stud 36. By means of the pertinent hexagonal socket wrench the key 40 can be pivoted into its locking or unlocking release position by pivoting by 90° in both directions by way of the adjustment stud 36.

As is to be seen especially from FIG. 3, in the release position the energy storage device 32 is relieved and extends within the housing wall 46 in an assigned chamber-like depression 48 between the key 38 and part of the housing wall 46 which constitutes the upper boundary of the depression 48 when viewed in the direction of looking at the figures. The indicated energy storage device 32 consists of a disk spring assembly with two disk springs which are positioned on top of each other.

As FIG. 1 furthermore shows, the adjustment stud 36 in the locking position is additionally fixed in position by way of a detent locking configuration 50. For this detent locking configuration 50, in the base body 24 there is a transverse hole which holds a compression spring (not shown) which on its one free end is secured by a screw-in bolt (not shown) and which on its other free end has a detent piece, for example in the form of a detent ball (not shown) which presses into an assigned shell-shaped recess 52 on the outside circumference of the cylindrical adjustment stud 36 when fixing has been effected.

Figure 2:
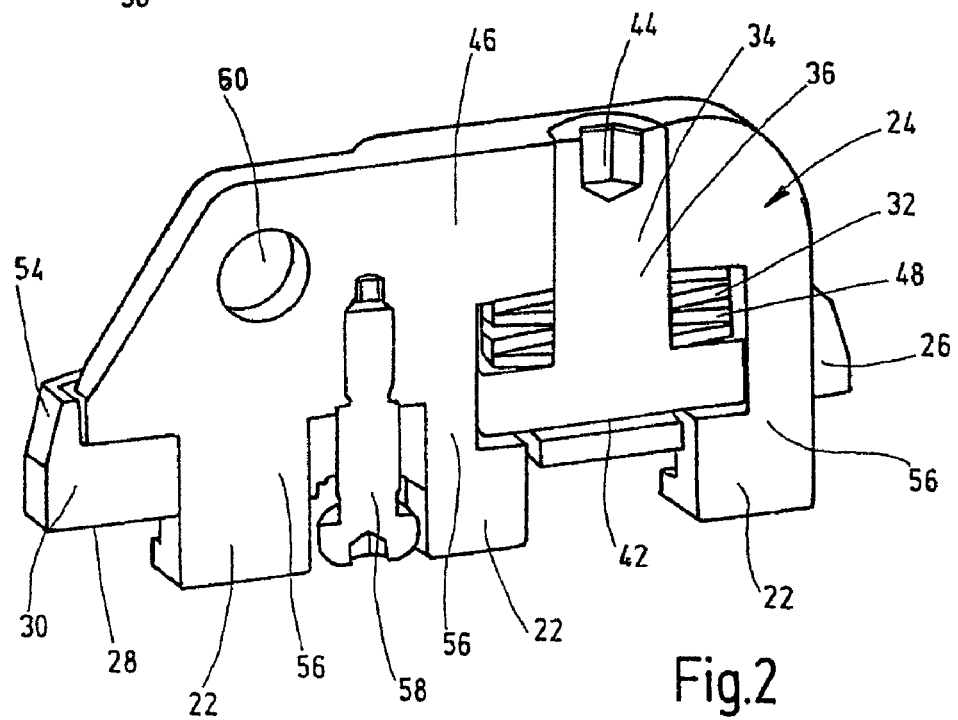
FIG. 2 shows a longitudinal section through the object as shown in FIG. 1, but in the unlocked release position.

The mounting part 26 is designed as a contact plate which, provided with an enclosing edge 54, in this way encloses the base body 24 for relative motion between it and the mounting part 26. Crosspieces 56 of the base body 24 extend through this contact plate, as illustrated especially by FIG. 2; the respective detent part 22 is located on their free ends. As is furthermore to be seen in FIG. 2, the mounting part 26 and the base body 24 are coupled to each other by way of a safety retention device 58 which seeks to hold the mounting part 26 in the release position in the direction of the base body 24 by means of a further energy storage device which is not detailed, provided for example in the form of a compression spring. This configuration allows free displacement of the base body 24 together with the mounting part 26 along the securing rail 10 for purposes of selecting the fixing position for the seat which is to be fixed. The safety retention device 58 has a mounting screw for this purpose which at one point between the two front crosspieces 22 engages the bottom of the base body 24, and moreover the pertinent screw bolt of the safety retention device 58 extends through the mounting part 26 in this area. Between the screw head of the mounting screw and the bottom of the mounting part 26 a compression spring which is not detailed is then inserted and presses the mounting part 26 against the bottom of the base body 24. This contact corresponds to the unlocked state for the securing system or fitting part as shown in the figures. Furthermore, the base body on its upper side facing the passenger seat has a mounting eye 60 for fixing the indicated upright parts of the base frame of the respective passenger seat on the cabin floor or floor of the vehicle.

All components of the rail securing system are preferably executed in a lightweight construction, for example from steel or titanium. The above described seat securing system with several detent parts 22, 30 which are configured severally in pairs positioned opposite each other on the side edge of the rail-shaped hollow section, are especially suited for backward attachment of the respective upright base of a vehicle or aircraft passenger seat. This seat securing system can however also be used in the forward area of the respective seat, that is, for a seat base located frontmost, on its attachment to the cabin floor. Since for the front seat base area the stress is less than in the backward area in the event of a crash, it is sufficient to mount the above described embodiment with only one pair of opposing detent parts 22, 30 on the securing rail so that the seat securing system modified in this way (not shown) can be shorter in installation length.

To fix the seat securing system on the securing rail 10 it assumes its unlocked, release position as shown in FIG. 3 and the detent parts 22 are inserted into the assigned through openings 18 in the longitudinal channel 14 by way of the crosspieces 56. Then, by moving longitudinally by one half a grid dimension, engagement from below between two adjacent through openings 18 is effected in the securing rail 10 on the bottom of the section flanks 16 of the hollow section. At this point the adjustment stud 36 is pivoted clockwise by 90° by way of the hexagonal socket recess 44 until the detent safety device 50 engages the housing wall 46 of the base body 24 and keeps the adjustment stud 36 in the pivoted locking position. For this position however the key 38 is then pivoted out of its release position in the key groove 40 by 90° into the locking position as shown in FIG. 4, in which the key 38 rests on the contact walls 42 of the mounting part 26.

In this locking position then the mounting part 26 is displaced against the action of the other energy storage device in the area of the safety retention device 58 relative to the base body 24, and the other detent parts 30 from overhead engage the assigned through openings 18 so that by way of the detent parts 22 of the base body 24 there is protection against lifting out of the section rail and the other detent parts 30 prevent possible longitudinal displacement motion in the longitudinal direction of the securing rail 10. Since the fixing process takes place under the effect of the energy storage device 32, the locking position is not only interlocked, but also frictionally implemented, and vibrations, impacts, or the like which may be introduced in the securing rail are relayed to the base body 24 damped by way of the energy storage device 32 in the form of the disk spring assembly, and accordingly to the seat structure of the aircraft passenger seat which is to be secured.

Figure 5:
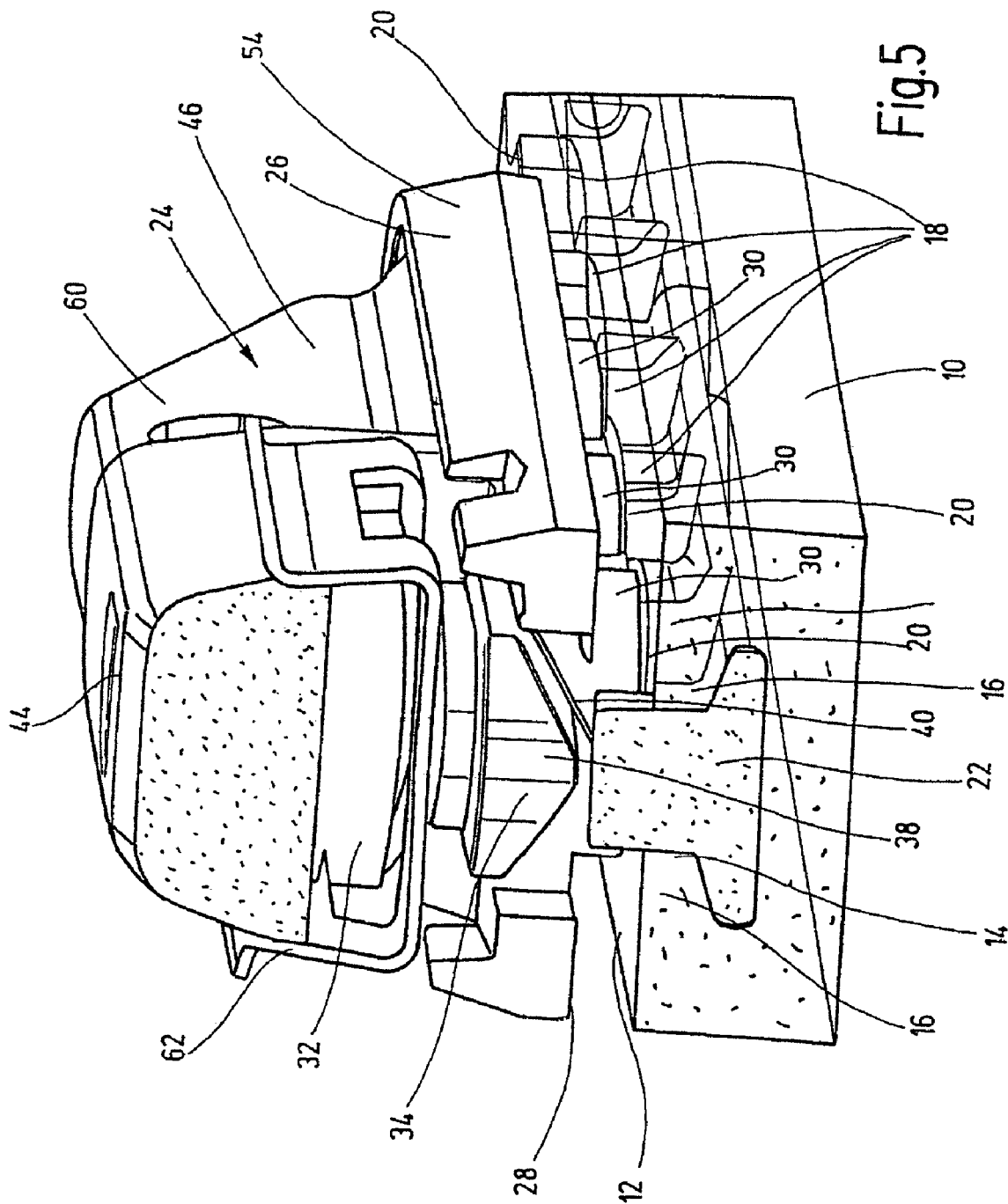
FIG. 5 shows a rear sectional representation corresponding to FIG. 3, with a fitting used in the securing rail, essentially consisting of a base body and a mounting part (not locked).

The detachment process takes place in the reverse direction, in which the key 38 in turn is pivoted back by way of the engagement stud 36 out of its locking position shown in FIG. 4 into the release position as shown in FIG. 3. If a spring of the disk spring assembly as a preferred embodiment of the energy storage device 32 should break, this has no adverse effect on the secure fixing of the aircraft passenger seat; however, continued function as a damping means (anti-rattle function) is lost. As an additional safety measure as shown in FIG. 5 it can furthermore be provided for the disk spring assembly in a configuration as an energy storage device 32 to be guided in the form of a retaining clamp 62 which is supported on the base body 24 with its clamp ends. But it has been shown that such a retaining clamp 62 is not absolutely necessary.

With the solution as claimed in the invention it is possible based on the chambering of the housing for the energy storage assembly formed from the disk spring configuration to be captively held even if a disk spring of the combination can no longer perform its task due to mechanical damage. When the seat securing system is in the detached, that is, in the unlocked state, it can be moved as a whole along the rail and fixed in definable positions. In this way, with only one manipulation the seat securing system can be securely fixed and braced on the rail so that the so-called anti-rattle function is achieved. Furthermore, it is preferably provided that the seat securing system be equipped with an indication means such that an installer or maintenance specialist can easily see from the outside whether the seat securing system is in the locked state, for example on the rail, or in the release position. For this purpose the key 38 which can be pivoted and locked on the peripheral side in diametrically opposite positions preferably has color markings, for example red and green, so that for the locked position of the seat securing system for example as shown in FIG. 1, facing the viewer the key 38 on its free face and accordingly has a red marking correspondingly opposite, and conversely in the release position, for example as shown in FIG. 3, a green marking is facing the viewer and when pivoted away the red marking is covered by the housing parts.

The invention claimed is:

1. The A seat securing system, especially for securing aircraft passenger seats to the floor of an aircraft, having at least one securing rail designed as a hollow section which on its upper side facing the aircraft passenger seat is provided with a longitudinal channel which is bordered by the free section flanks of the hollow section and which in the longitudinal direction of the securing rail in a definable grid has through openings which widen its free entry cross section and which are used for engagement of detent parts of a base body which are configured in succession in a row and are spaced apart from each other, the spacing of the detent parts of the base body being adapted to the spacing of the through openings, and when the detent parts move in relative terms opposite the through openings along the longitudinal axis of the securing rail the detent parts can be moved into contact with the section flanks of the hollow section, and next to the base body as an additional component there being a mounting part for mounting on the securing rail, which part has other detent parts for engagement with the assignable through openings, characterized in that in the relative motion between the mounting part and the base body, they can be moved transversely to the longitudinal direction of the securing rail into a fixing position and that in the fixing position a locking body which is under the action of an energy storage device and which can be pivoted from a release position into a locking position fixes the respective detent parts and accordingly the base body and mounting part on the securing rail, wherein the locking body has a key which can be pivoted in the base body by means of an adjustment stud and which in the release position engages a key groove of the mounting part and in the locking position transversely thereto overlaps the upper side walls which border the key groove the edge side.

2. The seat securing system as claimed in claim 1, wherein the release position the energy storage device relieved extends between the key and a depression in the base body and wherein the energy storage device is tensioned when it assumes the locking position.

3. The seat securing system as claimed in claim 1, wherein the adjustment stud in the locking position is additionally fixed in position by way of a detent locking configuration.

4. The A seat securing system, especially for securing aircraft passenger seats to the floor of an aircraft, having at least one securing rail designed as a hollow section which on its upper side facing the aircraft passenger seat is provided with a longitudinal channel which is bordered by the free section flanks of the hollow section and which in the longitudinal direction of the securing rail in a definable grid has through openings which widen its free entry cross section and which are used for engagement of detent parts of a base body which are configured in succession in a row and are spaced apart from each other, the spacing of the detent parts of the base body being adapted to the spacing of the through openings, and when the detent parts move in relative terms opposite the through openings along the longitudinal axis of the securing rail the detent parts can be moved into contact with the section flanks of the hollow section, and next to the base body as an additional component there being a mounting part for mounting on the securing rail, which part has other detent parts for engagement with the assignable through openings, characterized in that in the relative motion between the mounting part and the base body, they can be moved transversely to the longitudinal direction of the securing rail into a fixing position and that in the fixing position a locking body which is under the action of an energy storage device and which can be pivoted from a release position into a locking position fixes the respective detent parts and accordingly the base body and mounting part on the securing rail, wherein the mounting part designed as a contact plates which, provided with an enclosing edge, encloses in this way the base body for the relative motion between it and the mounting part and wherein the contact plate is provided with further detent parts on its side facing the securing rail.

5. The seat securing system as claimed in claim 4, wherein crosspieces of the base body extend through the contact plate and the respective detent part is located on their free ends.

6. A seat securing system especially for securing aircraft passenger seats to the floor of an aircraft, having at least one securing rail designed as a hollow section which on its upper side facing the aircraft passenger seat is provided with a longitudinal channel which is bordered by the free section flanks of the hollow section and which in the longitudinal direction of the securing rail in a definable grid has through openings which widen its free entry cross section and which are used for engagement of detent parts of a base body which are configured in succession in a row and are spaced apart from each other, the spacing of the detent parts of the base body being adapted to the spacing of the through openings, and when the detent parts move in relative terms opposite the through openings along the longitudinal axis of the securing rail the detent parts can be moved into contact with the section flanks of the hollow section, and next to the base body as an additional component there being a mounting part for mounting on the securing rail, which part has other detent parts for engagement with the assignable through openings, characterized in that in the relative motion between the mounting part and the base body, they can be moved transversely to the longitudinal direction of the securing rail into a fixing position and that in the fixing position a locking body which is under the action of an energy storage device and which can be pivoted from a release position into a locking position fixes the respective detent parts and accordingly the base body and mounting part on the securing rail, wherein the mounting part and the base body are coupled to each other by way of a safety retention device which seeks to keep the mounting part in the release position in the direction of the base body provided by means of a further energy storage device.

* * * * *